Sept. 27, 1966  R. L. SHARP ETAL  3,275,889
PROTECTION NETWORK
Original Filed June 13, 1958

INVENTORS
William E. Glassburn &
Robert L. Sharp
BY
John L. Stoughton
ATTORNEY

United States Patent Office 3,275,889
Patented Sept. 27, 1966

3,275,889
PROTECTION NETWORK
Robert L. Sharp, Pequannock, and William E. Glassburn, Mountainside, N.J., assignors to Westinghouse Electric Corporation, East Pittsburgh, Pa., a corporation of Pennsylvania
Original application June 13, 1958, Ser. No. 741,854, now Patent No. 3,144,590, dated Aug. 11, 1964. Divided and this application July 15, 1963, Ser. No. 295,105
18 Claims. (Cl. 317—14)

This invention relates to networks for deenergizing electrical apparatus upon the occurrence of internal faults and of preventing the deenergization of such apparatus when the fault is external to the apparatus as well as preventing the deenergization of such apparatus upon the initial energization of such apparatus. This application is a division of our copending application Serial No. 741,854 filed June 13, 1958, now Patent No. 3,144,590, for Frequency Selective Networks and assigned to the same assignee as is this invention.

It is an object of this invention to provide means for disconnecting an electrical apparatus such as a transformer when the magnitude of an electrical quantity which enters the apparatus is not substantially balanced by a like magnitude of the quantity leaving the apparatus during normal operation and for preventing such disconnection when the difference in magnitude occurs in response to an initial energization of the apparatus.

A further object is to provide means sensitive to the magnitude of such electrical quantity which is at a frequency above the fundamental frequency of such quantity for altering the magnitude of such quantity at the fundamental frequency which will cause disconnection of the apparatus.

A still further object is to utilize as the altering frequency the second harmonic frequency of the fundamental frequency.

Other objects of the invention will become apparent from the following description taken in conjunction with the accompanying drawings in which.

Figure 1:
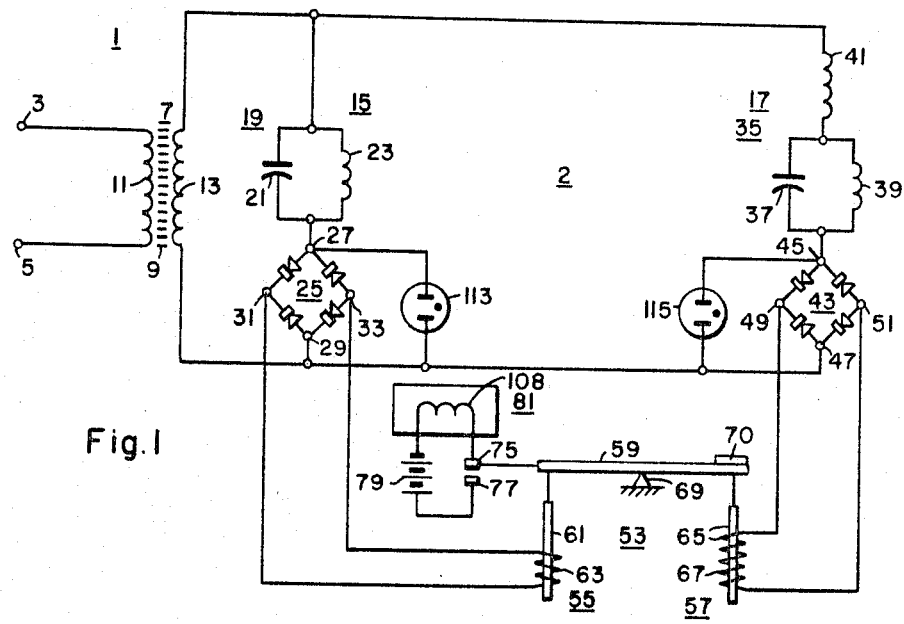
FIGURE 1 is a schematic representation of a frequency selective system constructed in accordance with the invention.

Referring to the drawings, there is illustrated in FIG. 1 a frequency selective system represented generally by the numeral 1 constructed in accordance with the teachings of the present invention. The system 1 includes a network which is represented generally by the numeral 2 having a pair of spaced input terminals 3 and 5 for supplying energization to a suitable transformer 7.

The transformer 7 may be of the air gap type including a magnetic core 9 of any suitable magnetic material having an air gap such that saturation of the core is prevented over a substantial range of energizations of the input terminals 3 and 5. The transformer 7 includes further a primary winding 11 and a secondary winding 13 which surround the core in inductive relation with each other.

The network also includes a pair of parallel connected frequency responsive circuit means 15 and 17. These circuit means are connected to be energized by currents derived from voltage induced in the secondary winding 13 resulting from energization of the terminals 3 and 5. Each of the circuit means 15 and 17 may include a frequency responsive network which presents an impedance to current traversing the network which varies in response to changes in the frequency of such current.

As will appear hereinafter the network 1 may be employed to control operation of a suitable translator such as a direct current relay having operating and restraining means. In the present invention, the network 1 is employed to restrain operation of the relay for a particular frequency, and to permit operation of the relay unit for other frequencies applied to the network 1.

In the preferred embodiment of the invention illustrated, the circuit means 15 includes a parallel resonant network 19 having a condenser 21 and an inductance 23 connected in parallel relation with the condenser. In the present invention, the network 19 is designed to resonate at a preselected frequency for which operation of the associated relay unit is to be prevented. As will presently appear, the network 19 may be selected to resonate at a frequency of substantially 120 cycles per second for a particular application of the network 1.

In order to derive a direct current quantity from the alternating quantity which traverses the network 19, a suitable rectifying device 25 is connected for energization by the alternating current traversing the network 19. The device 25 includes a pair of input terminals 27 and 29 connected in series relation with the network 19 to constitute a portion of the circuit means 15. The device 25 may be of the full-wave bridge type including a pair of output terminals 31 and 33. These output terminals may be connected to the operating means of the associated relay unit as will presently appear.

The circuit means 17 includes a network 35 which is designed to present a high impedance to currents having frequencies which are to cause operation of the associated relay unit. For this purpose, the network 35 may be in the form of a parallel resonant network designed to resonate at a particular frequency for which operation of the relay unit is desired. This network includes a condenser 37 connected in parallel relation with an inductance 39. For the particular application previously mentioned, the network 35 may be selected to exhibit a maximum impedance to currents having a frequency of approximately 60 cycles per second.

The present invention further provides that the circuit means 17 includes a network presenting a minimum impedance to currents having a frequency for which operation of the associated relay unit is to be prevented. To this end the circuit means 17 may include a series resonant network designed to exhibit a minimum impedance to currents having this frequency, which may, for example, be substantially 120 cycles per second. Conveniently, this network may comprise the series connection of an inductance 41 and the network 35.

The circuit means 17 may include a rectifying device 43 which is similar to the device 25. The device 43 includes input terminals 45 and 47 connected in series relation with the network 35 for energization by alternating currents traversing the network 35. The device 43 is illustrated as being of the full-wave bridge type including output terminals 49 and 51. These output terminals may be connected to the restraining means of the associated relay unit.

The relay unit previously referred to is represented generally by the numeral 53 and is connected for energization by the direct currents appearing at the output terminals of the rectifier devices 25 and 43. The unit 53 may be of any suitable construction and is illustrated in the form of a direct current balanced beam relay unit having operating and restraining means 55 and 57, respectively. If desired, the unit 53 may comprise a direct current polar relay.

As illustrated in FIG. 1, the relay 53 may include an operated element 59 in the form of a bar supported for pivotal movement by a suitable knife edge 69. A pair of spaced magnetic bars 61 and 65 are attached to the bar 59 at its ends in any suitable manner to be suspended in vertical positions as viewed in FIG. 1. The bars 61 and 65 may be formed of any suitable magnetic material. A pair of electroconductive windings 63 and 67 surround respectively the bars 61 and 65 in order to effect vertical displacement of the bars 61 and 65 when the windings are energized. When the two windings are energized to produce different ampere-turns the associated bar will be displaced vertically in a downward direction to thereby effect pivotal movement of the bar 59 about the knife edge 69. As will appear hereinafter, the winding 67 is preferably provided with a greater number of turns than the winding 63 for a particular application of the invention.

In order to control operation of the relay 53 in accordance with the frequency of currents energizing the terminals 3 and 5, the windings 63 and 67 are connected respectively for energization by currents traversing the circuit means 15 and 17. For this purpose, the operating winding 63 is connected across the output terminals 31 and 33 of the device 25 of the circuit means 15. The restraining winding 67 of the relay 53 is connected across the terminals 49 and 51 of the device 43 of the circuit means 17. The arrangement is such that the operated element 59 will be moved to an operated position when the ampere-turns produced by energization of the winding 63 exceeds the ampere-turns produced by energization of the winding 67. When the winding 67 is energized to produce ampere-turns greater than the ampere-turns developed by current energizing the winding 63, the element 59 is restrained against operation.

The element 59 may have an electroconductive contact 75 attached thereto in any suitable manner for movement therewith with respect to a fixed electroconductive contact 77. These two contacts are arranged for engagement when the element 59 is operated, and may be included in a series circuit which also includes a battery 79 and suitable translating means 81 which may be in the form of a relay coil 108. When the network 1 is deenergized, the member 59 is in its neutral position as illustrated in FIG. 1. When the ampere-turns of the operating winding 63 exceeds that of the restraining winding 67, the element 59 is pivoted such that the contact 75 is moved into engagement with the contact 77 to thereby permit energization of the translating means 81. However, when the ampere-turns of the winding 67 is equal to or greater than that of the winding 63, the contact 65 is spaced from the contact 77 to thereby prevent energization of the translating means 81. A suitable weight 70 may be secured to the bar 59 to balance the weight of the contact 75.

As shown in FIG. 1 a pair of neon lamps 113 and 115 are connected across the alternating current terminals of the devices 25 and 43 respectively. This arrangement prevents the devices 25 and 43 from being subjected to excessive currents and voltages. If the applied currents and voltages becomes excessive, the lamps will light and reduce such currents and voltages.

Figure 2:
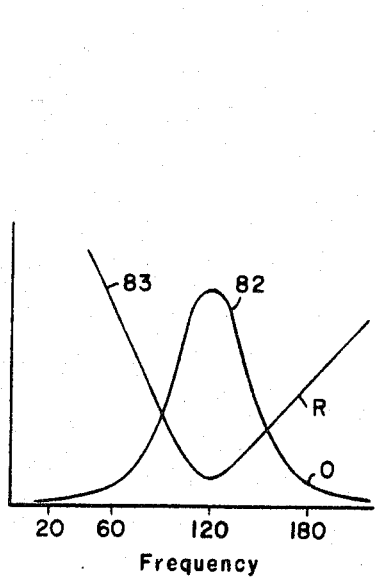
FIG. 2 is a graphical representation illustrating certain electrical quantities present in the network of FIG. 1.

Referring now to FIG. 2, there is illustrated a graphical representation showing the relationship between certain electrical quantities in the network 1. In FIG. 2, the ordinate represents the impedance presented by the circuit means 15 and 17 to current passing therethrough. The abscissa represents the frequency of the currents traversing the circuit means 15 and 17. The representation of FIG. 2 illustrates a curve 82 which depicts the variation of impedance presented to currents traversing the circuit means 15 as a result of changes in the frequency of such currents. A curve 83 depicts the variation of impedance presented to currents traversing the circuit means 17 in response to changes in the frequency of these currents.

It is observed with reference to FIG. 2 that the curves 82 and 83 depict maximum and minimum impedance points for the same particular frequency which may be 120 cycles per second for a particular application described hereinafter. For this application, the curve 82 shows a maximum impedance point for this frequency whereas the curve 83 shows a minimum impedance point for this same frequency. With this arrangement, then, the ampere-turns of the restraining winding 67 will be considerably greater than that of the operating winding 63 with the result that the relay 53 is in a restrained condition for a frequency of 120 cycles per second.

FIG. 2 further reveals that for frequencies of approximately 60 cycles per second and below, and for frequencies of approximately 180 cycles per second and above, the impedance presented by the circuit means 15 is less than the impedance presented by the circuit means 17. The arrangement is such that for these frequencies, the ampere-turns of the winding 63 exceeds that of the winding 67 with the result that the element 59 is in an operated condition to permit energization of the translating means 81. It is to be understood that the network 1 may be designed such that the minimum and maximum impedance points occur for any desired frequency. Furthermore, the design of the network 1 may be such that any desired selectivity may be exhibited by the circuit means 15 and 17.

The network 1 may be employed in a number of various applications. For example, the network 1 may be utilized to supervise the operation of a differential relay which is employed to protect apparatus such as a transformer device. When a differential relay is utilized to protect a transformer, the relay may be subjected to falses operations for falsely operating an associated circuit breaker during initial energization of the transformer when magnetizing inrush currents are supplied to the transformer. It has been observed that such inrush currents possess a high percentage of a second harmonic frequency. The network 1 may be arranged to respond to such second harmonic current to prevent operation of the circuit breaker in response to operation of the differential relay when the transformer is initially energized.

In this particular application, the network 1 is designed such that operated element 59 is restrained against operation when the second harmonic current exceeds approximately 15% of the fundamental frequency current to prevent operation of an associated circuit breaker. For this purpose the winding 67 is preferably provided with approximately six and two-thirds times the number of turns provided for the winding 63.

Figure 3:
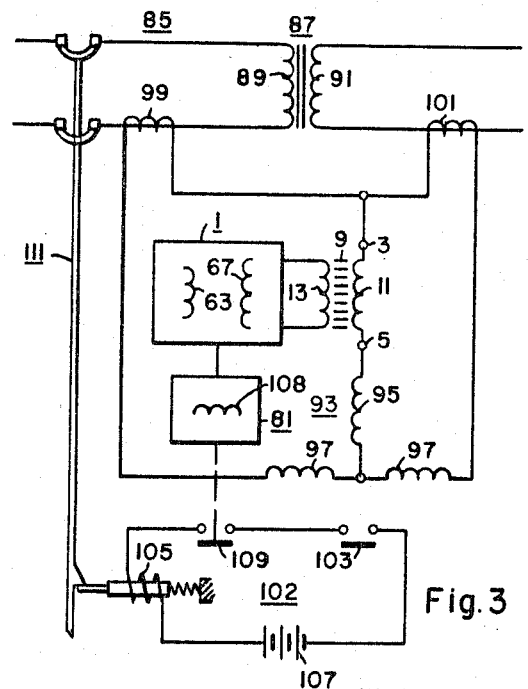
FIG. 3 is a schematic representation of a relay system including the network of FIG. 1.

In FIG. 3, in which like characters have been used to designate like parts of FIG. 1, there is illustrated a relaying system associated with an alternating current circuit 85 which may, for example, operate at a frequency of sixty cycles per second. The circuit 85 includes a transformer 87 having primary and secondary windings 89 and 91 respectively. In order to protect the transformer 87 against internal faults, a differential relay 93 of any suitable construction may be associated with the transformer.

The relay 93 is conventional and may include an operating winding 95 and a pair of restraining windings 97. The windings 95 and 97 act upon a suitable operated element (not shown) to respectively operate and restrain the operated element which controls the switch 103. In FIG. 3, the windings 95 and 97 are shown to be connected for energization in accordance with currents in the circuit 85 through suitable current transformers 99 and 101 responsive to primary and secondary currents of the transformer 87.

Under normal energizing conditions of the transformer 87, the winding 95 is in a deenergized condition and the relay 93 will not operate. However, when an internal fault of the transformer 87 occurs, current will flow through the operating winding 95, and currents will flow in opposite directions through the windings 97 to thereby cause operation of the differential relay. This operation may be employed to operate a circuit breaker 111 to disconnect the transformer 87.

It has been observed that when the protected transformer is initially energized, current flows through the winding 95 effective to operate the relay to thereby falsely operate the breaker 111. In order to prevent establishment of a trip circuit 102 for the breaker 111 upon the occurrence of inrush currents to the transformer 87 when the transformer is initially energized, the present invention provides that the translating means 81 of the relay 53 includes a winding 108 arranged to actuate when energized a switch 109 which is connected in the circuit 102 in series relation with a switch 103 actuable in response to operation of the relay 93. It will be apparent that these elements have been previouly described in connection with FIG. 1 and are part of system 1 thereof. The switches 103 and 109 may be connected in series in the circuit 102 with a battery 107 and a trip coil 105 which may be arranged to actuate when energized the circuit breaker 111.

As previously stated false operation of the relay 93 occurs as a result of the passage of currents through the winding 95 of the relay 93 during initial energization of the transformer 87. For a normal operating frequency of 60 cycles per second of the circuit 85, the second harmonic current will have a frequency of 120 cycles per second. In order to supervise operation of the relay 93, the network 1 is connected to be energized in accordance with energization of the winding 95. For this purpose, the primary winding 11 of the network 1 may be connected in series relation with the winding 95.

With the network 1 designed as described previously, actuation of the switch 109 will be prevented in response to energization of the network 1 by currents which have a frequency of 120 cycles per second, and which have a value exceeding approximately 15% of the value of the fundamental current. This arrangement will prevent energization of the trip coil 105 to thereby prevent actuation of the circuit breaker 111. As described previously, the network 1 may be designed such that when substantially zero current traverses the terminals 3 and 5 the operated element 59 will be in its neutral position as illustrated in FIG. 1. Consequently, during normal energization of the transformer 87, the element 59 will be in such neutral position since substantially zero current traverses the windings 95 and 11 during such normal energization.

It is desirable that the breaker 111 is tripped in response to internal faults of the transformer 87 occurring during times when the frequency of the circuit 85 is less than the normal frequency thereof, such as 60 cycles per second. Such low frequency operation may occur during periods when a generator energizing the transformer 87 is initially operated. If a fault should occur during such periods, the current through the winding 63 will be sufficient to produce ampere-turns of the winding 63 which exceed the ampere-turns of the winding 67 to operate the element 59 and to thereby actuate the switch 109. This arrangement then will allow energization of the coil 105 when the switch 103 is actuated as a result of operation of the relay 93.

As previously stated during times when the transformer is normally energized substantially zero current will flow through the terminals 3 and 5 of the network 1. Consequently, for this normal condition the operated member 59 will be in its neutral position, and the switch 109 will be open. The network 1 is designed such that for a normal frequency of 60 cycles per second the member 59 is operated only when a preselected amount of current flows through the terminals 3 and 5. This preselected amount is preferably less than the amount of current required to operate the relay 93 in response to internal faults of the transformer 87.

Although the invention has been described with reference to certain specific embodiments thereof, numerous modifications are possible and it is desired to cover all modifications falling within the spirit and scope of the invention.

We claim as our invention:

1. In a protecting network, a pair of input connections each adapted to supply an alternating quantity having a fundamental component of a first predetermined frequency, first relay means having normally open contacts moved to closed condition in response to the energization of an operating winding, means connecting said winding between said connections whereby it is energized in accordance with the difference in magnitude of said quantity at said connections, second relay means having normally open contacts held in open condition in response to the energization of a restraint winding, and means including a filter network connecting said winding of said second relay means to respond to the magnitude of said quantity in at least one of said input connections, said filter network being effective to attenuate current flow therethrough at all frequences except those which are substantially at a second predetermined frequency, and an output circuit including in series relation said contacts of both said relay means.

2. The combination of claim 1 in which said second frequency is the second harmonic of said first frequency.

3. In combination, first and second relays, each said relay having an operating circuit rendered in a first operating condition by an operating means and maintainable in a second operating condition by a restraining means, first and second input circuits, said input circuits normally being energized by an electrical quantity at a first predetermined frequency, circuit means connecting said restraining means of said first relay for energization as a function of the total magnitude of said alternating electrical quantities at said input circuits, said second relay having supply terminals, said circuit means also connecting said operating means of said first relay and said supply terminals for energization as a function of the difference in the magnitude of said quantity at said input circuits, first and second networks, said first network being tuned to attenuate the portion of said quantity which is at frequencies which are other than substantially that of a second frequency and to pass the portion of said quantity which is substantially at said second frequency, said second frequency being greater than said first frequency, said second network being tuned to attenuate said portion of said quantity which is at said second frequency and to pass said portion at said first frequency, means connecting said operating means of said second relay to said supply terminals and including said second network, and means connecting said restraining means of said second relay to said supply terminals and including said first network.

4. The combination of claim 3 in which said restraining means of said first relay is energized as a function of the sum of the magnitudes of said input circuits and in which said second frequency is the second harmonic frequency of said first frequency.

5. In combination, a pair of input terminals, a first current controlling device having an operating element and a first output circuit normally maintained in one operating condition and placed in another operating condition in response to a desired energization of said element, a second current controlling device having a restraining element and a second output circuit having first and second operating conditions and maintainable in said first condition in response to a determined energization of said restraining element, circuit means connecting said elements to said input terminals for energization thereof by the magnitude of an alternating electrical quantity which may exist between said terminals, said circuit means including a first network intermediate said terminals and said restraining element for attenuating those portions of said quantity which occur at a frequency which is substantially of a first predetermined magnitude and to pass substantially unattenuated solely that portion of said quantity which occurs substantially at a second frequency of said quantity, said second frequency being greater than said first frequency, a pair of output terminals, and means connecting said output circuits between said output terminals such that said output terminals are maintained in a desired condition solely when said first output circuit is in its said another condition and said second output circuit is in its said second condition.

6. The combination of claim 5 in which a pair of input circuits are connected to energize said input terminals to supply thereto said electrical quantity as a function of the difference in magnitude of said quantities in said input circuit, in which said first current controlling device includes a restraining means to restrain the placing of its said output circuit into said second condition, and in which said restraining means is energized by the magnitude of said quantity in at least one of said input circuits.

7. The combination of claim 5 in which said second current controlling device includes an operating means connected to said input terminals through a second network, said second network being tuned to attenuate those portions of said quantity which occur substantially at said second frequency, said operating means being effective to actuate said second output circuit into its said second operating condition at a predetermined relative energization of said restraining element and of said operating means.

8. In a relaying device, first and second input circuits, first and second relay devices, each said device including operating and a restraining winding means and a switch actuated as a function of the difference in the energization of its said winding means, means connecting said restraining winding means of said first device to at least one of said input circuits for energization in accordance with the magnitude of an electrical quantity in said one input circuit, means connecting said operating winding means of said first device to both of said input circuits for energization in accordance with the difference in said magnitudes of said electrical quantity in said input circuits, means including filter means connecting said restraining winding means and said operating winding means of said second device to said input circuits for energization in accordance with the difference in magnitudes of an alternating electrical quantity appearing at said input circuits, said filter means being effective to attenuate the passage of first portions of said alternating quantity to said restraining winding means, said first portions being those which occur at all frequencies other than those which are substantially of a selected frequency whereby said restraining winding means is energized solely by second portions of said quantity which occur at frequencies substantially at said selected frequency, said filter means being effective to attenuate the passage of said second portions of said alternating quantity to said operating winding means whereby said operating winding means is energized solely with said first portions of said quantity.

9. In combination, first and second devices, each said device including operating and restraining means for controlling the conductive condition of an output circuit which is rendered in a first condition solely when its said operating means is energized and is dominating its said associated restraining means, a control circuit having a first operating condition solely when both of said output circuits are in their said first conditions, first and second input circuits, said second device having input terminals, means connecting said restraining means to said input circuits for energization therefrom in accordance with the magnitude of an electrical quantity in at least one of said input circuits, means connecting said operating means of said first device to said input circuits for energization therefrom in accordance with the difference in magnitude of said alternating electrical quantity in said input circuits, said second device including a first network interconnecting its said operating means and said input terminals and a second network interconnecting its said restraining means and said input terminals, said second network being tuned to attenuate that portion of said quantity which occurs at a first frequency and to pass solely that portion of said quantity which occurs substantially at a second frequency, said first network being tuned to attenuate solely that portion of said quantity which occurs at substantially said second frequency.

10. The combination of claim 9 in which said second frequency is greater than said first frequency.

11. The combination of claim 9 in which said second frequency is the second harmonic frequency of said first frequency.

12. In a relay system, a first relay device for protecting an alternating electrical apparatus having input and output connections, said device having operating and restraining means, means connecting both of said means for energization in accordance with the difference in magnitude of an electrical quantity in said input and said output connections, a second relay device having control terminals energized in response to said magnitude difference, and second device including an operating means energized from said control terminals through a first network and a restraining means energized from said control terminals through a second network, said second network being effective to attenuate that portion of said quantity which is substantially of a first frequency and to pass that portion of said quantity which is substantially of a second frequency, said first network being effective to attenuate solely that portion of said quantity which is substantially of said second frequency, and a control device operable solely when both of said relays are actuated by their respective said operating means.

13. In combination, first and second relay devices, each said relay device including an output circuit having conducting and non-conducting conditions and having actuating means for controlling the condition of its associated said output circuit, each said actuating means including at least a pair of windings, first and second input circuits, first circuit means connecting a first of said windings of said first relay for energization as a function of the magnitude of an alternating electrical quantity in said first input circuit, second circuit means connecting a second of said windings of said first relay for energization as a function of the magnitude of said electrical quantity in said second input circuit, third circuit means connecting a third of said windings of said first relay for energization as a function of the difference in the magnitude of said electrical quantity in said first and said second input circuits, first and second filters, fourth circuit means connecting a first of said windings of said second relay for energization as a function of said difference in said magnitude of said electrical quantity and including said first filter, fifth circuit means connecting a second of said windings of said second relay for energization as a function of said difference in said magnitude of said quantity and including said second filter, said second filter being tuned to attenuate all portions of said quantity except that portion which occurs substantially at a selected frequency of alternation and to pass solely that portion of said quantity which occurs substantially at said selected frequency of alternation, said first filter being tuned to attenuate that portion of said quantity which occurs substantially at said selected frequency, said actuating means of said first relay device being effective when solely its said first and its said second windings are energized to maintain its said output circuit in its said non-conducting condition and effective when its said third winding is energized to maintain its said output circuit in its said conducting condition, said actuating means of said second relay device being effective to maintain its said output circuit in its said conducting condition at a first relative energized condition of its said windings and effective to maintain its said output circuit in its said non-conducting condition at a second relative energized condition of its said windings.

14. In combination, first and second relay, each said relay including a pair of normally open contacts and windings for controlling the condition of said contacts, first and second pairs of input terminals, first circuit means connecting a first terminal of said first pair of terminals to a second terminal of said second pair of terminals and including first and third windings of said first relay, said first and third windings having a common connection, second circuit means connecting a second terminal of said first pair of terminals to a first terminal of said second pair of terminals, a saturating core transformer having primary connections and secondary connections, third circuit means connecting said common connections to said second circuit means and including a second winding of said first relay and said primary connections, first and second filter networks, said first network being tuned to attenuate the flow of an alternating current quantity which is at a fundamental frequency and to permit the flow of said quantity which is at the second harmonic frequency of said fundamental frequency, fourth circuit means connecting a first of said windings of said second relay to said secondary connections and including said first network, said second network being tuned to attenuate the flow of said quantity which is at said second harmonic frequency, fifth circuit means connecting a second of said windings of said second relay to said secondary connections and including said second network, said relays being arranged such that energization of said second windings tend to close the respective said contacts, said first relay being so arranged that said first and third windings of said first relay act to restrain closure of said first relay contacts by its said second winding, said second relay being so arranged that said first winding of said second relay acts to restrain closure of said second relay contacts by its said second winding.

15. In combination, first and second relays, each said relay having an operating circuit rendered in a first operating condition by an operating means and maintainable in a second operating condition by a restraining means, first and second input circuits, circuit means connecting said restraining means of said first relay for energization as a function of the total magnitude of the alternating electrical quantities at said input circuits, said second relay having supply terminals, said circuit means also connecting said operating means of said first relay and said supply terminals for energizations by a first portion of said total magnitude, said first portion being a function of the difference in the magnitude of said quantity at said input circuits, first and second tuned networks connecting respectively said restraining means and said operating means of said second relay to said supply terminals, said first network being tuned to attenuate the part of said first portion of said quantity which is at a first frequency and to pass the part of said first portion of said quantity which is at a second frequency greater than said first frequency, said second network being tuned to attenuate the part of said first portion of said quantity which is at said second frequency and to pass the part of said first portion of said quantity which is at said first frequency, and output circuit means connected to be actuated solely when said operating circuits of both of said relays are in their said first operating condition.

16. The combination of claim 15 in which said second frequency is the second harmonic frequency of said first frequency.

17. A protecting relay for an electrical transformer having input and output connections, first and second current transformers adapted to have their primary windings individually energized as a consequence of current flow in said input and output connections and having secondary windings, first and second relays, each said relay having operating and restraint windings and at least one set of contacts closed as a consequence of a predetermined relative energization of its said operating and restraint windings, first and second tuned networks individually connected in series with a restraint and an operating winding respectively of said second relay to provide first and second circuit means, third circuit means connecting a first and a second of said restraint windings of said first relay in series circuit between first terminals of said secondary windings of said current transformers, fifth circuit means connecting together second terminals of said secondary windings of said current transformers, sixth circuit means connecting said first circuit means and said second circuit means and an operating winding of said first relay between said fifth circuit means and a point in said third circuit means intermediate said first and second restraint windings of said first relay whereby said operating and restraint windings of said second relay and said operating winding of said first relay are energized by a current quantity equal to the difference in magnitude of the current in said secondary windings of said current transformers, said first network being tuned to attenuate the fundamental frequency of the output current of said transformers and to pass at least one harmonic frequency thereof, said second network being tuned to attenuate said one harmonic frequency and to pass said fundamental frequency.

18. The combination of claim 17 in which said fundamental frequency is a selected constant frequency, said one harmonic frequency is the second harmonic of said selected frequency, said first network is constructed to attenuate all frequencies which are not substantially of said second harmonic frequency, and said second network is constructed to attenuate all frequencies which are not substantially of said selected frequency.

References Cited by the Examiner

UNITED STATES PATENTS

| 2,290,101 | 7/1942 | Gutman | 317—49 |
| 2,863,100 | 12/1958 | Rice | 317—27 |
| 3,144,590 | 8/1964 | Sharp et al. | 317—14 X |

MILTON O. HIRSHFIELD, *Primary Examiner.*

L. T. HIX, *Examiner.*

J. D. TRAMMELL, *Assistant Examiner.*